United States Patent [19]

Wiedemann

[11] 3,950,749

[45] Apr. 13, 1976

[54] DOPPLER FREQUENCY IMPULSE RADAR SYSTEM WITH DISPLACED PULSE SEQUENCE

[75] Inventor: Kurt Wiedemann, Munich, Germany

[73] Assignee: Siemens Aktiengesellschaft, Germany

[22] Filed: June 12, 1961

[21] Appl. No.: 116,431

[30] Foreign Application Priority Data
June 21, 1960 Germany .................... S 69,023

[52] U.S. Cl. ......................... 343/7.7; 343/17.1 PF
[51] Int. Cl.² ...................................... G01S 9/42
[58] Field of Search .............. 343/7.7, 11, 13, 17.1, 343/8, 9, 17.1 PF

[56] References Cited
UNITED STATES PATENTS

| | | | |
|---|---|---|---|
| 2,746,033 | 5/1956 | Bachmann | 343/7.7 |
| 2,840,808 | 6/1958 | Woodward | 343/7.7 |
| 2,896,203 | 7/1959 | Wright | 343/7.7 |
| 2,933,725 | 4/1960 | Wright | 343/7.7 |
| 3,008,138 | 11/1961 | Berger | 343/7.7 |
| 3,029,428 | 4/1962 | Matthews | 343/11 |
| 3,031,659 | 4/1962 | Le Parquier | 343/17.1 PF X |
| 3,169,243 | 2/1965 | Kuhrdt | 343/17.1 PF X |
| 3,230,528 | 1/1966 | Van Den Broek et al. | 343/7.7 X |

*Primary Examiner*—T. H. Tubbesing
*Attorney, Agent, or Firm*—Hill, Gross, Simpson, Van Santen, Steadman, Chiara & Simpson

EXEMPLARY CLAIM

1. A doppler frequency impulse radar system, comprising a transmitting circuit for transmitting an impulse modulated carrier wave and a receiving circuit for receiving reflected echo impulses, said transmitting circuit including means for transmitting a first pulse sequence and means for transmitting a second pulse sequence having identical period durations, means for effecting a time displacement between the transmission of the respective pulse sequences which displacement is so selected that periodically recurring gaps appear in the spectral line spectrum of the transmitted signals, and doppler frequency filters operatively disposed in the signal path of the receiving circuit having a pass range corresponding to at least one of said gaps and having a pass width which is somewhat smaller than the width of a gap.

1 Claim, 5 Drawing Figures

Inventor.
Kurt Wiedemann.

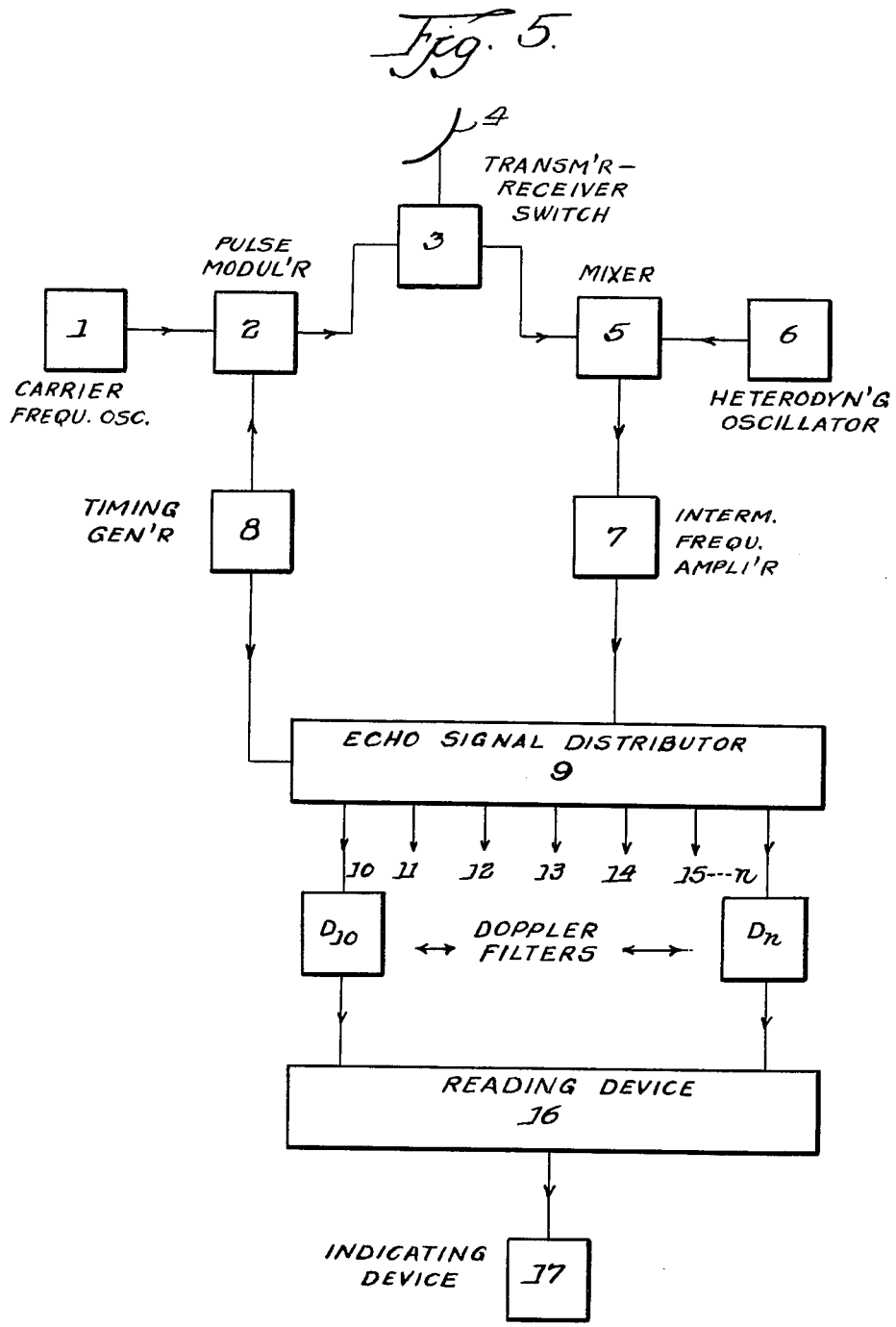

DOPPLER FREQUENCY IMPULSE RADAR SYSTEM WITH DISPLACED PULSE SEQUENCE

This invention is concerned with a doppler frequency impulse radar system with displaced pulse sequence.

The doppler frequency shift occuring in connection with moving objects is evaluated in doppler frequency impulse radar systems in order to distinguish between stationary and moving objects. Comb filters, simple doppler filters as well as delay lines are used for the separation. Known systems or apparatus of this kind usually suffer from the effect of blind velocities, making it impossible to indicate over great distance ranges rapidly moving objects unequivocally and without gaps.

In order to avoid the resulting difficulties, it is necessary to provide the data of the involved apparatus so that the first blind velocity is placed at the upper limit of the measuring range and possibly above the maximum radial speed of the object which is being tracked. This may be accomplished by utilizing a relatively high carrier wave length or by increasing the pulse sequence frequency. The use of the first noted expedient requires large antennae structures and other drawbacks resulting therefrom. The other expedient, calling for the use of carrier wave length as short as possible and increasing the pulse sequence frequency, suffers in the case of apparatus with relatively high transmitter output and great distance range, the drawback that echos from previously transmitted pulses return after the transmission of each pulse, such echos resulting respectively in false or equivocal distance indication.

In order to shift the first velocity blind spot in the direction of high velocities, it is known to use a displaced pulse sequence, whereby the pulses are transmitted with different spacing as to time. The suppression of stationary signals is effected by a switch-over timing chain. However, this procedure has the following drawback: It is in the signalling of moving objects usually desirable to suppress not only signals from stationary objects but also signals from relatively slowly moving objects. These slowly moving objects may be wind blown trees or rain clouds; corresponding signals may also result from instabilities of the radar apparatus, thereby simulating slowly moving objects. In order to avoid disturbances resulting from such signals, only those objects are indicated which move at a speed exceeding a predetermined minimum speed. However, this results in the appearance of blind velocity ranges in place of the discrete reactive velocity points, and the radar device will for this reason fail to deliver an indication with respect to many target speeds.

The object of the present invention is to avoid the drawbacks of previously known doppler frequency impulse radar systems operating with displaced pulse sequence, and to improve the apparatus of the corresponding systems.

The various objects and features of the invention will be explained below with reference to the accompanying drawings.

FIG. 1 shows over the time axis t the impulse diagram of a displaced pulse sequence;

FIG. 2 indicates over the velocity axis V the distribution of the blind spots of a normal pulse-doppler-radar device;

FIG. 5 illustrates in block diagram manner an embodiment of an impulse doppler radar apparatus or system operating in accordance with the invention with displaced pulse sequence.

Figure 1:
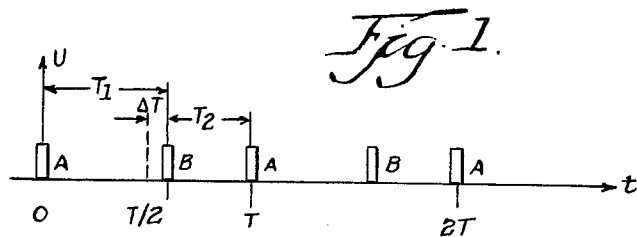

As indicated in FIG. 1, two pulse sequences A and B are transmitted with different spacing as to time $T_1$, $T_2$. The pulses A represent a pulse sequence with the period duration T, the pulses B which have the identical period duration T being with respect to the pulse sequence A displaced as to time by the amount $T/2 + \Delta T$. So far as the absolute value is concerned, the pulse sequences A and B have the same spectrum but their spectral lines are shifted as to phase.

Figure 2:
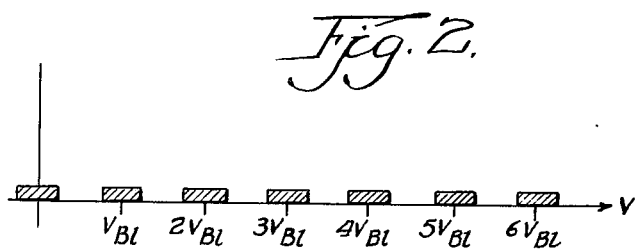
Figure 3:
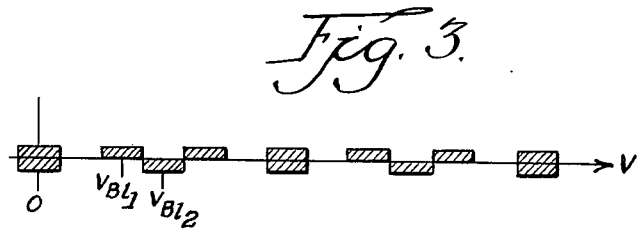
FIG. 3 represents the distribution of blind spots in connection with a known radar device operating with displaced pulse sequence, the evaluation being effected by means of a switch-over timing chain.

In FIG. 2 are entered the blind spots $V_{B1}$, $2V_{B1}$, $3V_{B1}$ ... etc., of a customary pulse doppler radar device, such points appearing shaded. FIG. 3 shows an improvement with respect to the distribution of the reactance ranges, such as is obtained by the known displacement of the pulse sequence. The drawback resides in the fact that the device does not deliver an indication at the point where the shaded ranges are in alignment.

In accordance with the invention, the displacement of the pulse sequence is selected so that periodically recurring gaps appear in the spectral line spectrum of the transmitted signals, doppler frequency filters being provided which have a pass range coinciding at least with one of these gaps and the pass width of which is somewhat smaller than the gap width.

Figure 4:
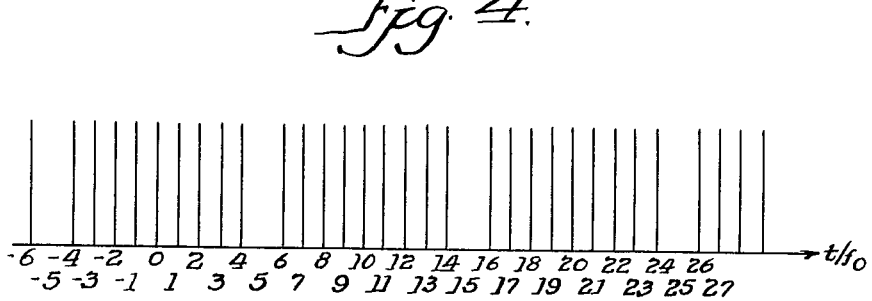
FIG. 4 shows the spectrum of a displaced pulse sequence such as it is utilized in accordance with the present invention.

According to the invention, the shifting $\Delta T$ is in FIG. 1 selected so that the n-th line in the total spectrum disappears or that it is suppressed. FIG. 4 shows such a spectrum with suppressed spectral lines, each fifth line being suppressed. The impulses are for simplification not shown in carrier position since the conditions appearing in carrier position are identical. The phrase "carrier position" is intended to mean the frequency position in which the impulses are modulated on a high frequency carrier, as contrasted with the video position in which the impulses appear respectively before the modulation and after demodulation thereof. As a further simplification, the amplitudes of the individual lines are assumed to be the same, which is of course actually not the case, but which can be neglected in the diagram.

It will be seen from the illustrated spectrum that the 3n-th, 5n-th lines are suppressed in addition to the n-th line. In accordance with the invention, in the gap between the (n−1)-th and the (n+1)-th line is placed the doppler filter, the pass range of which lies in the interval $(n-1) \cdot 1/T < f < (n+1) \cdot 1/T$. In the transmitting position, the echo impulses are upon reflection from moving objects by the doppler effect shifted in the frequency, so that lines always fall in the pass range of the filters, since the spacing of the neighboring lines $1/T$ is selected during the pass range f the filter $\Delta B > 1/T$. The band width of the filter is accordingly selected nearly equal to twice the spacing of two spectral lines, so that, upon appearance of the doppler effect due to reflection at moving targets, one line will always be within the pass range of the filter. The minimum speed at which signals from moving targets are to be suppressed, determines the amount by which the filter width is to be smaller than the gap width.

The gap in the spectrum appears periodically. The first blind velocity appears in the device according to the invention only when the doppler shift becomes so great that the next following gap in the spectrum reaches the pass range of the doppler filter. The amplitudes $A_n$ of the individual spectral lines are determined by the relation $$A_n = A_o \cos(n \cdot \pi/2 + n \cdot \pi(\Delta T/T/)).$$

From this equation is determined the transposition $\Delta T$ at which $A_n = 0$. The first blind velocity appears at $V_{B1} = 2n \cdot \lambda/2 \cdot 1/T$, and is accordingly determined mainly by n and therewith by $\Delta T$. The greater $n$ is, the higher will be the first blind velocity. The minimum speed below which no moving objects are to be indicated, is determined by the relation $$v_{min} < 1/4 \, \lambda/2 \cdot 2/T .$$

Accordingly, as compared with previously known operations with transposed or displaced pulse sequence, the invention results in the advantage that no further object speeds are suppressed above the minimum speed up to the stated first blind velocity point outside the measuring range.

The use of the doppler filter results in loss of the impulse character and therewith loss of the distance information. There is for this reason utilized, in known manner, a subdivision as to distance ranges, whereby a doppler filter is, according to the invention, assigned to each distance range. A circuit arrangement is used for this purpose which permits only the echos of the respective distance range to reach the filter which is assigned thereto. This is in practical operation in known manner accomplished by the use of timing filters, that is, gate switches, serving for successively scanning with sampling pulses the distance measuring branches corresponding to the individual distance measuring ranges.

FIG. 5 shows an embodiment of this kind, wherein the doppler frequency impulse radar apparatus comprises a carrier frequency oscillator 1, from which the carrier frequency to be transmitted is extended over an impulse modulator 2 comprising an amplifier and a transmitterreceiver switch 3 to the radar antenna 4. At the receiver side, the echos received by the antenna 4 are conducted over the transmitter-receiver switch 3 to the mixer 5 in which the intermediate frequency is formed by heterodyning from the heterodyning oscillator 6, which is amplified in the intermediate frequency amplifier 7. A timing generator 8 delivers the displaced or transposed pulse sequence shown in FIG. 1, with which the transmitter is modulated in the modulator 2, the timer 8 also controlling the echo signal distributor 9 to which are conducted the received echo pulses from the intermediate frequency amplifier 7. The signals are by the distributor 9 distributed to separate distance measuring branches 10, 11, 12 . . . $n$, which are successively scanned by sampling pulses delivered by the timing generator 8. In each of these distance measuring branches is disposed a doppler filter $D_{10}$ . . . $D_n$, which is dimensioned according to the invention, the individual filters operating with respect to a reading device 16 which receives the radar signals evaluated in this manner as to the doppler frequency shift thereof, delivering such signals to an indicating device 17 operating with PPI-indication or the like.

Changes may be made within the scope and spirit of the appended claims which define what is believed to be new and desired to have protected by Letters Patent.

I claim:

1. A doppler frequency impulse radar system, comprising a transmitting circuit for transmitting an impulse modulated carrier wave and a receiving circuit for receiving reflected echo impulses, said transmitting circuit including means for transmitting a first pulse sequence and means for transmitting a second pulse sequence having identical period durations, means for effecting a time displacement between the transmission of the respective pulse sequences which displacement is so selected that periodically recurring gaps appear in the spectral line spectrum of the transmitted signals, and doppler frequency filters operatively disposed in the signal path of the receiving circuit having a pass range corresponding to at least one of said gaps and having a pass width which is somewhat smaller than the width of a gap.

* * * * *